(12) United States Patent
Cho et al.

(10) Patent No.: US 11,481,003 B2
(45) Date of Patent: Oct. 25, 2022

(54) MOBILE TERMINAL

(71) Applicant: LG ELECTRONICS INC., Seoul (KR)

(72) Inventors: Ilkyoung Cho, Seoul (KR); Hangyu Oh, Seoul (KR); Cheongsun Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/269,903

(22) PCT Filed: Sep. 21, 2018

(86) PCT No.: PCT/KR2018/011276
§ 371 (c)(1),
(2) Date: Feb. 19, 2021

(87) PCT Pub. No.: WO2020/059920
PCT Pub. Date: Mar. 26, 2020

(65) Prior Publication Data
US 2021/0318726 A1    Oct. 14, 2021

(51) Int. Cl.
*G06F 1/16*    (2006.01)
*H04M 1/02*    (2006.01)

(52) U.S. Cl.
CPC ........ *G06F 1/1652* (2013.01); *H04M 1/0249* (2013.01); *H04M 1/0268* (2013.01); *G06F 2203/04103* (2013.01)

(58) Field of Classification Search
CPC ........ G06F 1/1652; G06F 2203/04103; H04M 1/0249; H04M 1/0268
See application file for complete search history.

(56) References Cited

U.S. PATENT DOCUMENTS

| | | | |
|---|---|---|---|
| 2014/0065326 A1* | 3/2014 | Lee | G09F 9/301 428/12 |
| 2015/0192951 A1* | 7/2015 | Chong | G06F 1/1652 359/894 |

(Continued)

FOREIGN PATENT DOCUMENTS

| | | | |
|---|---|---|---|
| KR | 10-2012-0034506 A | | 4/2012 |
| KR | 20120034506 A | * | 4/2012 |

(Continued)

*Primary Examiner* — Alexander Eisen
*Assistant Examiner* — Kebede T Teshome
(74) *Attorney, Agent, or Firm* — Birch, Stewart, Kolasch & Birch, LLP

(57) ABSTRACT

A mobile terminal comprises a first body; a second body arranged in parallel to the first body; a hinge part for connecting the first body and the second body such that an angle formed between the first body and the second body varies; a display panel positioned on one surface of the first body and one surface of the second body; and a window positioned on the front surface of the display panel, wherein the window comprises a first window which is positioned on the first body and/or the second body and which does not bend, and a second window which is connected to the first window and which bends, and thus present invention improves the strength of a flexible display unit so as to prevent shock delivery in both the vertical and lateral directions.

13 Claims, 9 Drawing Sheets

(56) References Cited

U.S. PATENT DOCUMENTS

| | | | |
|---|---|---|---|
| 2015/0241925 A1* | 8/2015 | Seo | G06F 1/1681 361/679.27 |
| 2016/0165697 A1* | 6/2016 | Jang | H05B 33/04 313/511 |
| 2019/0369667 A1* | 12/2019 | Yug | H01L 51/0097 |

FOREIGN PATENT DOCUMENTS

| | | |
|---|---|---|
| KR | 10-2014-0033546 A | 3/2014 |
| KR | 10-2016-0028839 A | 3/2016 |
| KR | 10-2016-0069560 A | 6/2016 |
| KR | 10-2016-0111597 A | 9/2016 |
| KR | 10-2017-0026023 A | 3/2017 |

* cited by examiner (a)  (b)

(a)

(b)

(a)

t (thickness) = R-r (b)

(a)

(b)

(a)

(b)

(c)

(a)

(b)

(a)                      (b)

MOBILE TERMINAL

CROSS REFERENCE TO RELATED APPLICATION

This application is the National Phase of PCT International Application No. PCT/KR2018/011276, filed on Sep. 21, 2018, all of which is hereby expressly incorporated by reference into the present application.

TECHNICAL FIELD

The present disclosure relates to foldable mobile terminal in which reliability of a flexible display unit is improved.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Recently, a foldable mobile terminal bent using an OLED display based on an organic light emitting diode has been developed. However, a window positioned on a front surface of the OLED display is thin and a support structure of a rear surface also becomes thinner than that of the related art, whereby a problem occurs in that rigidity of the OLED becomes weak.

DISCLOSURE

Technical Problem

An object of the present disclosure is to provide a foldable mobile terminal in which reliability of a flexible display unit is improved.

Technical Solution

There is provided a mobile terminal comprising: a first body; a second body disposed in parallel with the first body; a hinge unit connecting the first body with the second body such that an angle between the first body and the second body varies; a display panel positioned on one surface of the first body and one surface of the second body; and a window positioned on a front surface of the display panel, wherein the window includes a first window which is positioned on the first body or the second body and is not bent, and a second window which is connected with the first window and is bent.

The mobile terminal may further comprise a transparent adhesive positioned between the first window and the second window, wherein the transparent adhesive may have elasticity stretching when the first body and the second body are folded.

The second window may fully cover a position corresponding to the hinge unit and a front surface of the first window.

The second window may also cover a rear surface of the first window.

The second window may be coupled to the first window by a double injection molding.

The mobile terminal may further comprise a transparent adhesive adhering the second window with the first window, wherein the transparent adhesive may include a silicon material.

In another aspect of the present disclosure, a mobile terminal comprises a first body; a second body disposed in parallel with the first body; a hinge unit connecting the first body with the second body such that an angle between the first body and the second body varies; a display panel positioned on one surface of the first body and one surface of the second body; a window positioned on a front surface of the display panel; a metal plate positioned on a rear surface of the display panel; and a spacer forming an air gap between the display panel and the metal plate.

The spacer may include a plurality of unit patterns disposed to be spaced apart from one another at a predetermined interval.

The unit patterns may be extended in a second direction vertical to a first direction and disposed to be spaced apart from one another in the first direction.

The spacer may be formed by coating and hardening a transparent adhesive or adhering a transparent tape.

The mobile terminal may further comprise an impulse absorbing layer of a soft material positioned on a rear surface of the metal plate.

Advantageous Effects

A foldable mobile terminal of the present disclosure may prevent impulse from being transferred in a side direction as well as a vertical direction by improving rigidity of a flexible display unit packaged on a front surface of the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Figure 1:
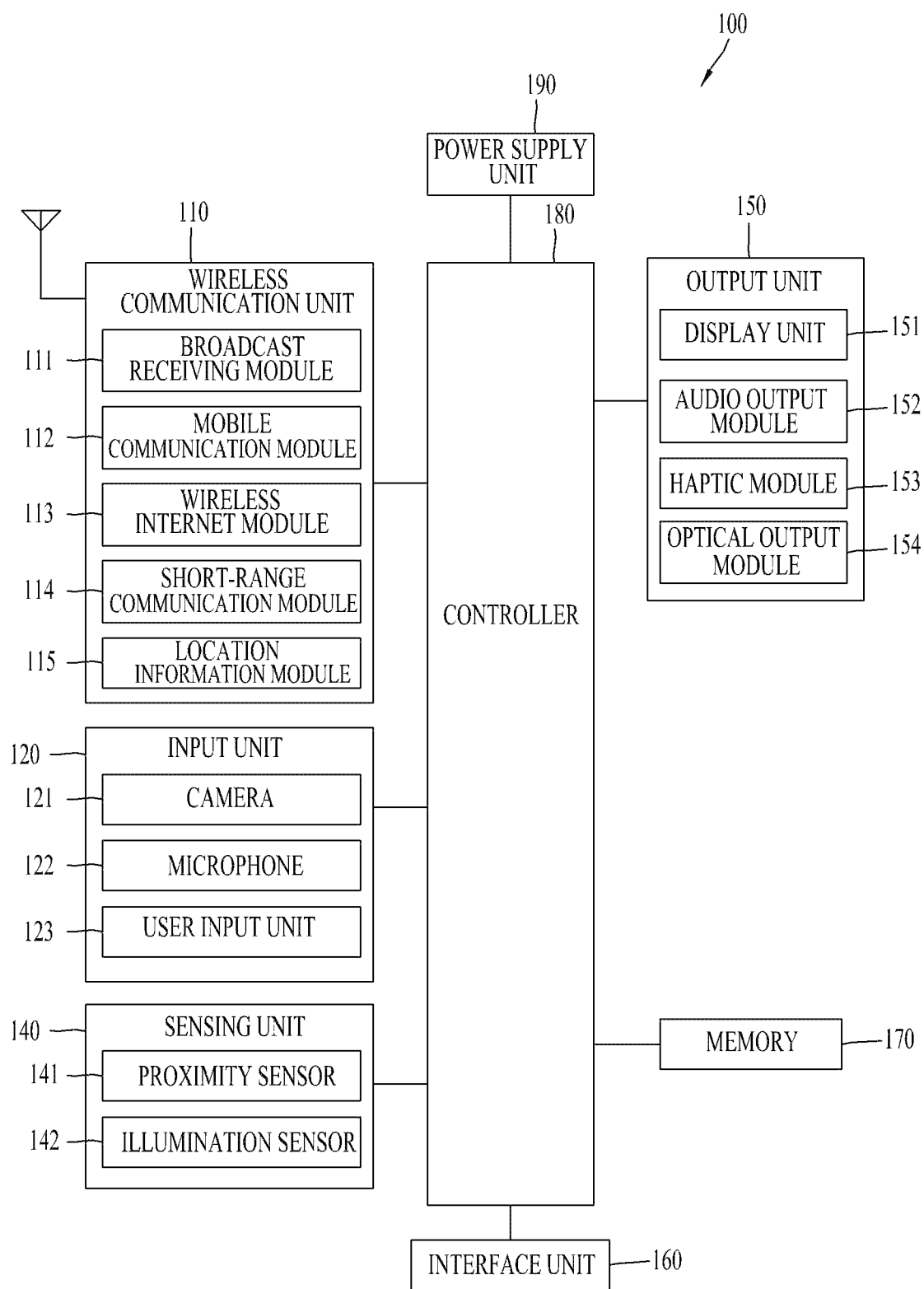
FIG. 1 is a block diagram of a mobile terminal in accordance with the present disclosure.

FIG. 1 is a block diagram of a mobile terminal in accordance with the present disclosure The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller.

The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2A:
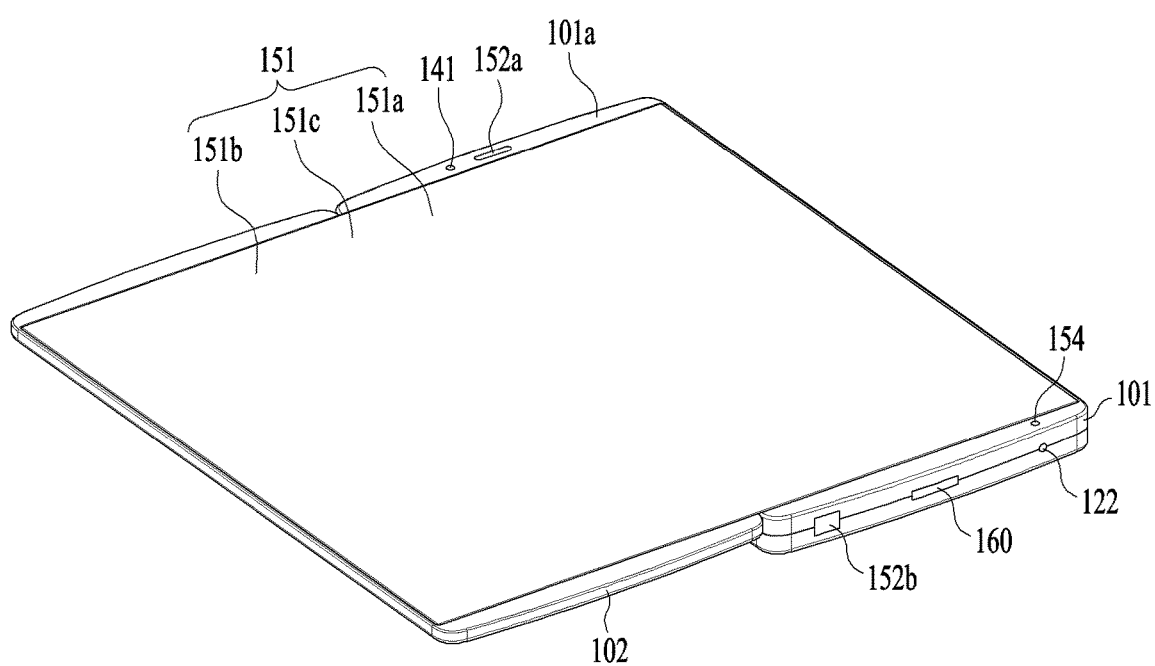
FIGS. 2a and 2b are views illustrating a first state and a second state of a mobile terminal according to one embodiment of the present disclosure.
Figure 2B:
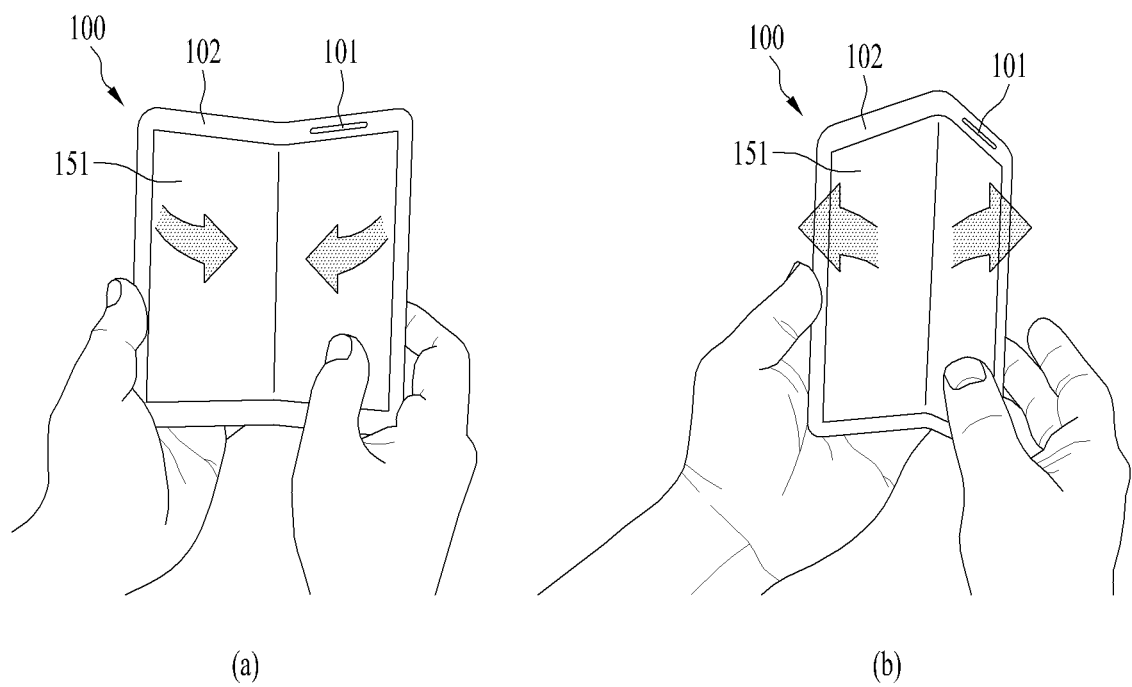

FIGS. 2a and 2b are views illustrating a first state and a second state of a mobile terminal according to one embodiment of the present disclosure. The mobile terminal of the present disclosure is comprised of two bodies, wherein a second body 102 is disposed at a side of a first direction of a first body 101. The first body 101 and the second body 102 are coupled to each other by a hinge unit, whereby an angle between the first body 101 and the second body 102 may vary.

On the drawings, each of the first body 101 and the second body 102 has a rectangular shape, the second body 102 is disposed in parallel with a long side of the first body 101, and a width direction of the first body 101 and the second body 102 may be referred to as a first direction and a length direction vertical to the width direction may be referred to as a second direction. However, the first direction and the second direction are not limited to the width direction and the length direction, respectively, and the first direction may be a length direction and the second direction may be a width direction.

The first body 101 and the second body 102 may have the same size, however, in this embodiment, electronic components may be packaged in the first body 101, and the second body 102 may be thinner than the first body. If the space in which the electronic components are packaged is divided into two, since the space that may be used is more reduced than an actual volume, a method for packaging most of electronic components in a body at one side is favorable in reducing a whole size.

The mobile terminal 100 will generally include a case (for example, frame, housing, cover, and the like) forming the appearance of the terminal. A plurality of cases are coupled to one another to form an inner space, and various electronic components are disposed in the inner space.

The display unit 151 is shown located on the front side of the terminal body to output information. As illustrated, a window 151a of the display unit 151 may be mounted to the front case 101 to form the front surface of the terminal body together with the front case 101. The cases 101, 102, 103 may be formed by injection-molding synthetic resin or may be formed of a metal, for example, stainless steel (STS), aluminum (Al), titanium (Ti), or the like.

The mobile terminal 100 may be configured such that one case forms the inner space. In this example, a mobile terminal 100 having a uni-body is formed in such a manner that synthetic resin or metal extends from a side surface to a rear surface.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Particularly, in the present disclosure, the display unit 151, of which curvature is variable together with the two bodies when the two bodies are rotated based on the hinge unit, may be used. As shown in FIG. 2b, the display unit 151 may be configured to be deformed by an external force. The deformation may be at least one of bending, curving, folding, twisting, and rolling of the display unit 151.

A mobile terminal may be bent in only one direction in accordance with a hinge type and a coupling method of the body and the flexible display unit 151, or may be bent in both directions as shown in FIG. 2.

The deformable display unit 251 may also be referred to as a "flexible display unit." In some implementations, the flexible display unit 251 may include a general flexible display, electronic paper (also known as e-paper), and combinations thereof.

The flexible display 151 is generally formed as a lightweight, non-fragile display, which still exhibits characteristics of a conventional flat panel display, but is instead fabricated on a flexible substrate which can be deformed as noted previously. Particularly, an organic light emitting diode (OLED) display based on an organic light emitting diode (OLED) may be implemented by a flexible member without a backlight, and less affects an image although bent, whereby the OLED display is used for a curved display unit or a flexible display unit.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 151 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 1512 and a display panel 1511 on a rear surface of the window 1512, or a metal wire which is patterned directly on the rear surface of the window 1512. Alternatively, the touch sensor may be integrally formed with the display. For example, the touch sensor may be disposed on a substrate of the display or within the display.

The flexible display unit 151 may also form a touch screen together with the touch sensor. Here, the touch screen may serve as the user input unit 123 (see FIG. 1). Therefore, the touch screen may replace at least some of the functions of the first manipulation unit 123a.

One option is to configure the mobile terminal 100 to include a deformation sensor which senses the deforming of the flexible display unit 151. The deformation sensor may be included in the sensing unit 140.

The deformation sensor may be located in the flexible display unit 151 or the case 101 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Other possibilities include most any type of information which can be sensed in response to the curving of the flexible display unit or sensed while the flexible display unit 151 is transitioning into, or existing in, the first and second states.

In some embodiments, controller 180 or other component can change information displayed on the flexible display unit 151, or generate a control signal for controlling a function of the mobile terminal 100, based on the information related to the deforming of the flexible display unit 151. Such information is typically sensed by the deformation sensor.

The mobile terminal 100 is shown having a case 101 for accommodating the flexible display unit 151. The case 101 can be deformable together with the flexible display unit 151, taking into account the characteristics of the flexible display unit 151.

The cause of state deformation of the flexible display unit 151 is not limited to an external force. For example, when the flexible display unit 151 has the first state, the flexible display unit 151 may be deformed to the second state by a user or a command of an application.

The flexible display unit 151 includes a first area 151a positioned on one surface of the first body 101, a second area 151b positioned on one surface of the second body 102, and a third area 151c positioned between the first area 151a and the second area 151b. The third area 151c covers sides of the first body 101 and the second body 102 at the second state.

If the first body 101 and the second body 102 are made of a hard material, the first area 151a and the second area 151b attached to the first body 101 are not bent but the third area 151c of the flexible display unit 151 is bent when the second state is changed to the first state.

The first audio output module 152a may be implemented in the form of a speaker to output voice audio, alarm sounds, multimedia audio reproduction, and the like.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The user input unit 123 are examples of the user input unit 123, which may be manipulated by a user to provide input to the mobile terminal 100. The user input unit 123 may also be commonly referred to as a manipulating portion, and may employ any tactile method that allows the user to perform manipulation such as touch, push, scroll, or the like. The user input unit 123 may also employ any non-tactile method that allows the user to perform manipulation such as proximity touch, hovering, or the like.

Meanwhile, the mobile terminal 100 may comprise a fingerprint recognition sensor for recognizing a user's fingerprint, and the controller 180 may use fingerprint information sensed through the fingerprint recognition sensor 143 as an authentication means. The fingerprint recognition sensor 143 may be embedded in the display unit 151 or the user input unit 123.

The microphone 122 is shown located at an end of the mobile terminal 100, but other locations are possible. If desired, multiple microphones may be implemented, with such an arrangement permitting the receiving of stereo sounds The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

Figure 3:
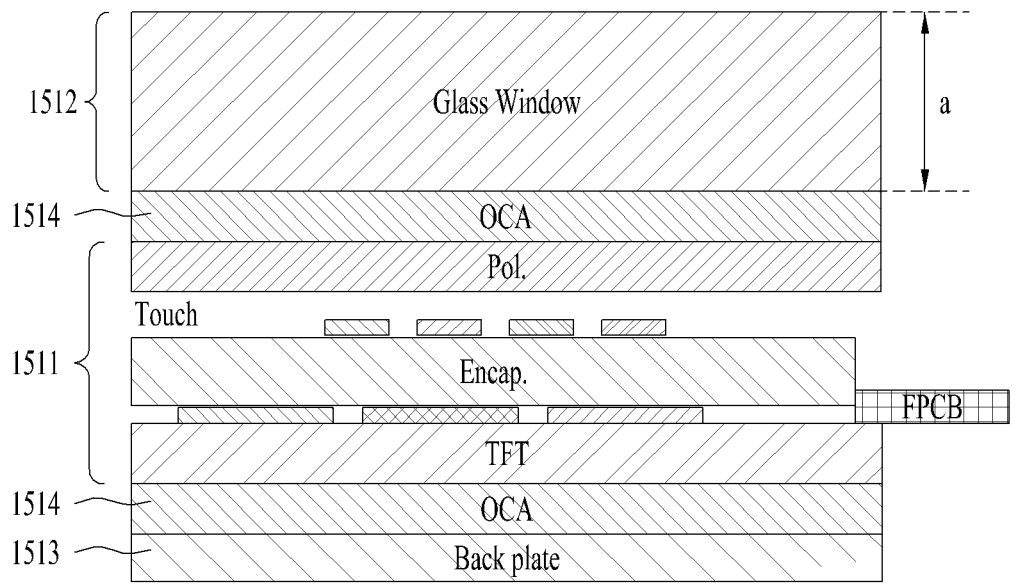
FIG. 3 is a view illustrating a structure comparison between a general display and a flexible display unit.
Figure 3:
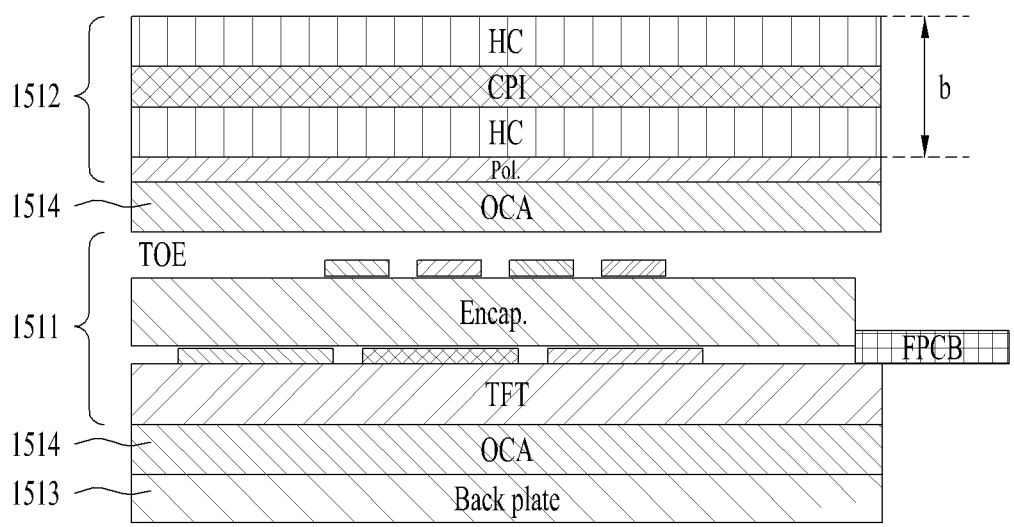

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen FIG. 3 is a view illustrating a structure comparison between a general display unit which is not bent and a flexible display unit 151. The display unit includes a display panel 1511 outputting an image, a window 1512 of a transparent material coupled to a front surface of the display panel 1511, and a back plate coupled to a rear surface of the display panel 1511, supporting the display panel 1511. The respective layers may be attached to each other by a transparent adhesive (OCA: Optical Clear Adhesive), and the display panel 1511 may further include a touch sensor.

The display panel 1511 based on a liquid crystal is thick due to a layered structure such as a backlight unit to inject the liquid crystal or supply light supplied from a light source, but the OLED display recently implemented using an organic light emitting diode becomes thin. Since the thin OLED makes sure of a packaging space by reducing a thickness of the mobile terminal and has a flexible property, whereby the OLED display may be applied to a foldable mobile terminal folded as shown in FIGS. 2a and 2b.

However, a problem occurs in that rigidity becomes vulnerable due to a thin display panel 1511. Since the display panel 1511 used for a general bar shaped terminal is not bent, a problem occurs in that the display panel has weak rigidity. As shown in FIG. 3(a), a window 1512 of a predetermined thickness may be attached to a front surface, and the back plate supporting a rear surface may reinforce rigidity of the flexible display unit 151 by using a member having a thickness of a certain level or more.

The OLED display may have a flexible property due to a lack of a backlight unit. The OLED display may be applied to a foldable mobile terminal folded as shown in FIGS. 2a and 2b by using the flexible property.

If a thick window 1512 or a back plate 1513 is used as shown in FIG. 3(a), problems may occur in that flexibility is deteriorated in a bent portion between the first body 101 and the second body 102 and slipping between the layers of the flexible display unit 151 is generated due to a difference in a curvature radius between the front surface and the rear surface of the flexible display unit 151.

Therefore, the window 1512 thinner than a window 1512' of the display unit which is not bent is used as shown in FIG. 3(b). If the window 1512 of a glass material is used for the display unit 151' of FIG. 3(a), the window 1512 subjected to hard coating (HC) on both surfaces of polyimide (CPI: Colorless Polyimide) may be used for the flexible display unit 151 of FIG. 3(b). Since a thickness 'b' of the window 1512 of FIG. 3(b) is thinner than a thickness 'a' of the window 1512 of FIG. 3(a), the display unit is more bent and slipping between the layers of the flexible display unit 151 may be reduced.

The respective layers of the flexible display unit 151 may be attached to each other by a transparent adhesive (OCA: Optical Clear Adhesive). The transparent adhesive is made of a film type to be suitable for deposition of the respective layers of the flexible display unit having a layered structure, and has light transmittance of 97% or more, whereby definition of a screen is more enhanced than that of the existing double-sided tape.

However, if the thin window 1512 which may be bent is used, a problem occurs in that the display unit is weak for impulse. In the present disclosure, in order to solve the problem, a first window 1512*a* of a glass material having rigidity is disposed on at least a portion of the portion which is not bent, and a second window 1512*b* of a soft material is disposed on the portion in which the hinge unit is positioned, whereby the flexible display unit 151 applicable to the foldable mobile terminal and having improved rigidity may be implemented.

Figure 4:
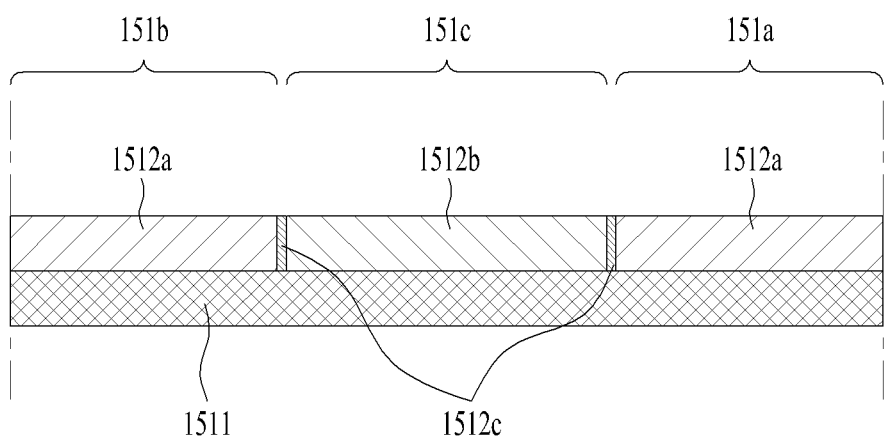
FIG. 4 is a view illustrating one embodiment of a flexible display unit of the present disclosure.
Figure 4:
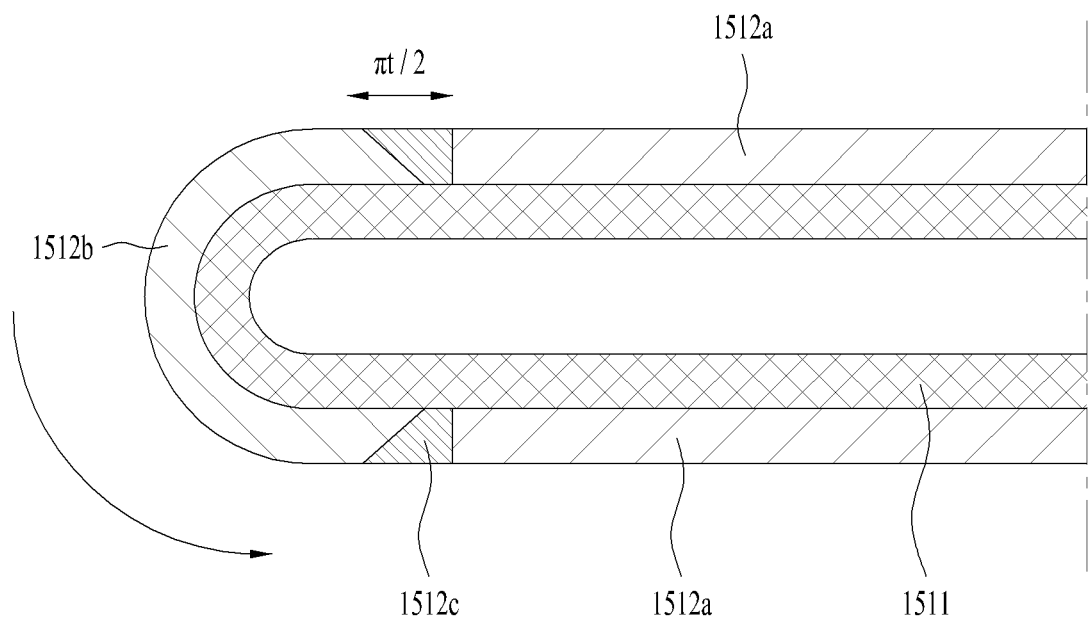

FIG. 4 is a view illustrating one embodiment of a flexible display unit 151 of the present disclosure, and is a section of the flexible display unit 151 near the hinge unit. Since the first area 151*a* and the second area 151*b* where the first body 101 and the second body 102 are positioned are not bent, the window 1512 of the first area 151*a* and the second area 151*b* is not bent and instead, the first window 1512*a* having rigidity may be disposed.

Since the third area 151*c* corresponding to the hinge unit should be bent as shown in FIG. 4(*b*), the second window 1512*b* of a soft material may be disposed in the third area 151*c*. Although FIG. 4(*a*) illustrates that the first window 1512*a* is disposed in both the first area 151*a* and the second area 151*b*, the first window 1512*a* may be disposed only in the first area 151*a* or the second area 151*b*, or may partially cover the first area 151*a* or the second area 151*b*. Instead, the first window 1512*a* is not disposed in the third area 151*c*, and the third area 151*c* includes only a second window 1512.

That is, the window 1512 of the present disclosure may be made of different materials depending on positions, and therefore the third area 151*c* may make sure of flexibility, whereby the flexible display unit 151 which is applicable to the foldable mobile terminal and has rigidity may be implemented. Since a glass material is harder than a polyimide material, the first window 1512*a* may be made of a glass material and the second window 1512*b* may be made of a polyimide material.

The first window 1512*a* and the second window 1512*b* may be coupled to each other in such a manner that the first window 1512*a* is formed by double injection molding and then coupled with the second window 1512*b*. As shown in FIG. 4, the first window 1512*a* and the second window 1512*b* may be coupled to each other by a transparent resin 1512*c* (OCR: Optical Clear Resin). The transparent resin 1512*c* may be made of a low modulus material having a tensile force and therefore compensate for a length difference between the front surface and the rear surface of the window 1512 when the flexible display unit 151 is bent as shown in FIG. 4(*b*).

If the hinge is folded such that the first body and the second body are disposed to be overlapped with each other as shown in FIG. 4(*b*) and polyimide has no length change during bending deformation, a length difference between an outer side and an inner side of the second window 1512*b* becomes a value obtained by multiplying a difference 't' between an inner diameter and an outer diameter of the curved portion of the second window 1512*b* by $\pi$. If the transparent resin 1512*c* is positioned at both sides of the second window 1512*b* in pairs as shown in FIG. 4(*a*), a stretching length of the transparent resin 1512*c* may be reduced to a half ($\pi t/2$).

Figure 5:
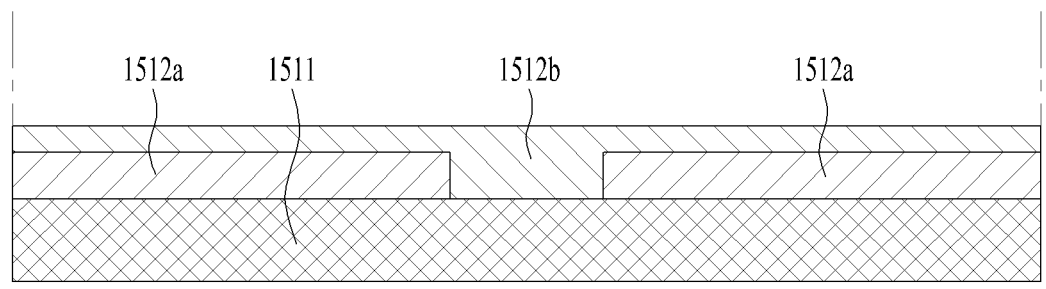
FIG. 5 is a view illustrating another embodiment of a flexible display unit of the present disclosure.
Figure 5:
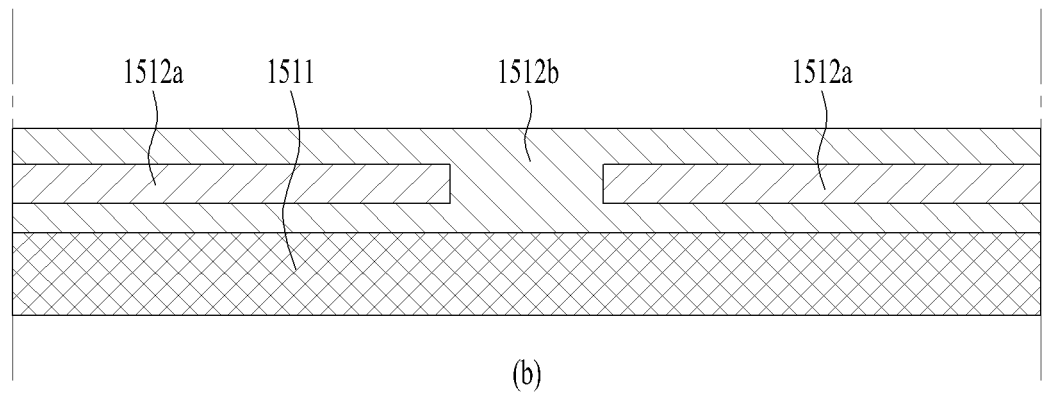

FIG. 5 is a view illustrating another embodiment of a flexible display unit 151 of the present disclosure. Although the thickness of the window 1512 becomes thin when the first window 1512*a* and the second window 1512*b* are disposed on the same plane in parallel as shown in FIG. 4, an adhesive surface between the first window 1512*a* and the second window 1512*b* becomes a limited area of a side as shown in FIG. 4(*a*). If the adhesive surface is narrow, the first window 1512*a* and the second window 1512*b* may be spaced apart from each other when an angle between the first body and the second body repeatedly varies. Also, even though an opaque material is used as the first window 1512*a* and the second window 1512*b*, a boundary surface may be seen due to a difference in a refractive index.

In order to solve this problem, the window 1512 having two or three layers may be implemented as shown in FIG. 5. The first window 1512*a* is positioned in a portion that is not bent and corresponds to at least one of the first body and the second body, whereas the second window 1512*b* may have a layered structure that covers one surface or both surfaces of the first windows 1512*a* as well as the position corresponding to the hinge unit. The second window 1512*b* may fully cover the surface exposed to the outside as shown in FIG. 5(*a*), or the second window 1512*b* may cover both surfaces of the first window 1512*a* as shown in FIG. 5(*b*), whereby the window 1512 having two- or three-layered structure may be implemented.

Since the portion exposed to the outside is made of one material, the case that the boundary surface between the first window 1512*a* and the second window 1512*b* is seen due to a difference in a refractive index may be minimized. Also, since the adhesive surface is wider than that of FIG. 4, the problem that the first window 1512*a* is spaced apart from the second window 1512*b* may be solved.

The first window 1512*a* and the second window 1512*b* may be coupled to each other by double injection molding and may be made of a transparent resin. When the first body 101 and the second body 102 are folded, the window 1512 comprised of a plurality of layers has a problem that fine slipping between the layers may be generated due to a radius difference between the respective layers but a tensile force of the transparent resin of a low modulus may counterbalance such slipping.

Since a silicon material has a tensile force greater than that of an acrylic material, the silicon material is suitable for a low modulus adhesive. The adhesive includes both a liquid type adhesive member hardened after coating a liquid type and a film type adhesive member such as a tape.

The embodiment shown in FIGS. 4 and 5 may provide the window 1512 which may partially be made of a material enabling bending deformation and a material having rigidity, whereby the window 1512 is strong to external impulse and deformable depending on deformation of the hinge unit.

Figure 6:
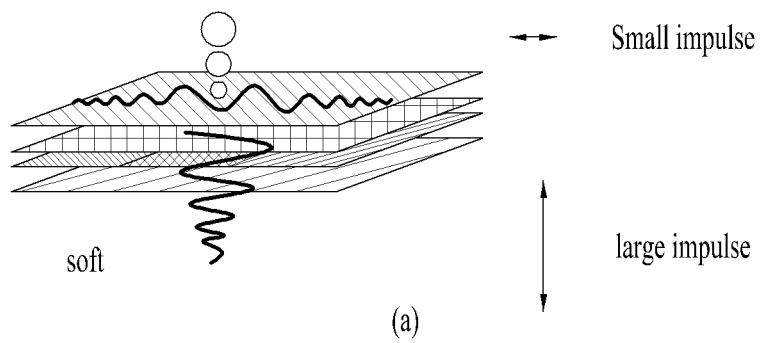
FIG. 6 is a view illustrating a transfer aspect of impulse based on a physical property of a flexible display unit.
Figure 6:
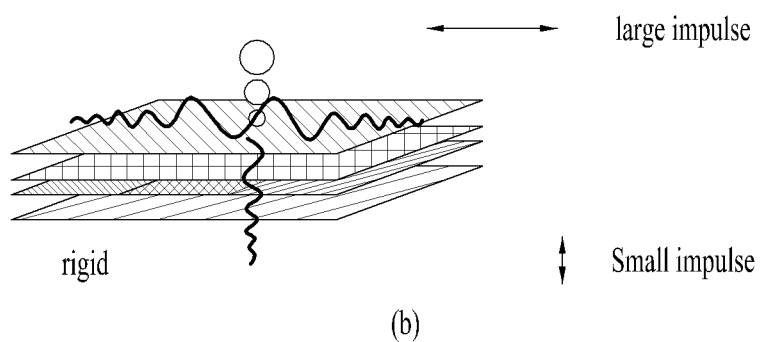
Figure 6:
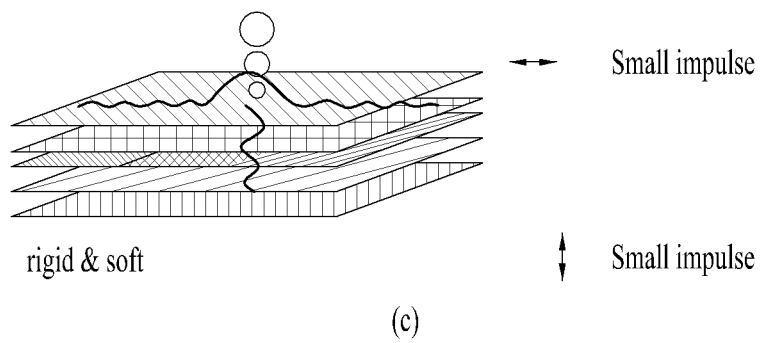

FIG. 6 is a view illustrating a transfer aspect of impulse based on a physical property of a flexible display unit. If the flexible display unit 151 is made of a soft material to be flexibly bent as shown in FIG. 6(*a*) and then impulse is applied to the surface in a thickness direction like ball drop, the impulse is not well transferred in left and right directions (surface direction of the flexible display unit) but is transferred in the thickness direction, whereby a problem occurs in that the display panel 1511 is damaged.

In order to solve the problem, if a metal plate 1515*a* made of a hard member is interposed on the rear surface of the display panel 1511 as shown in FIG. 6(*b*), it is advantageous in that impulse is not transferred in a thickness direction. However, a problem occurs in that impulse is transferred in a surface direction of the flexible display unit.

FIG. 6(*c*) illustrates that impulse is transferred when a member having rigidity and a soft member are configured to be deposited. The soft material may attenuate impulse applied to a thickness direction and the rigid material may reduce impulse transferred to a side direction, whereby whole impulse applied to the flexible display unit 151 may be reduced.

Figure 7:
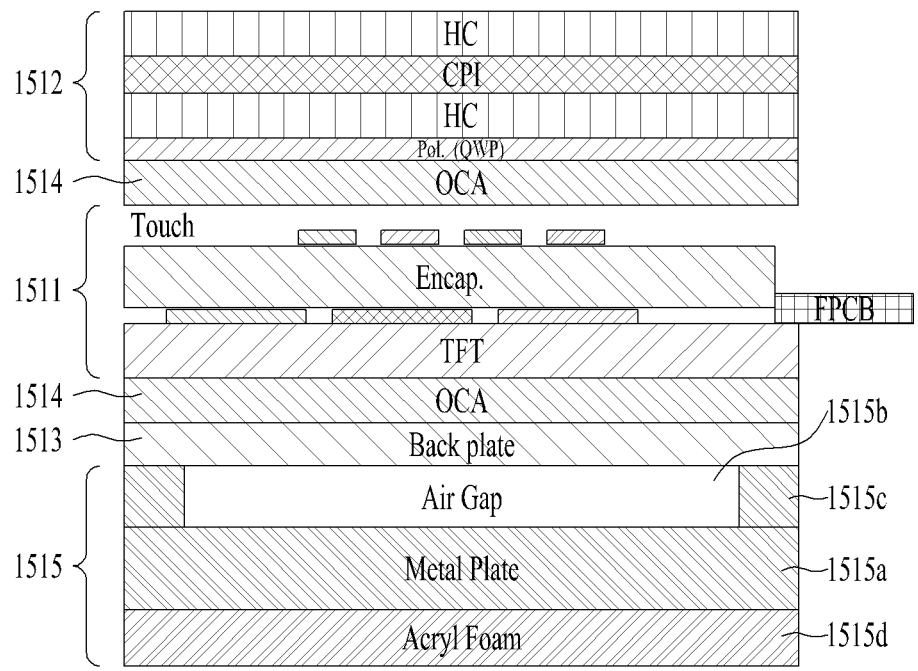
FIG. 7 is a view illustrating other embodiment of a flexible display unit of the present disclosure.
Figure 7:
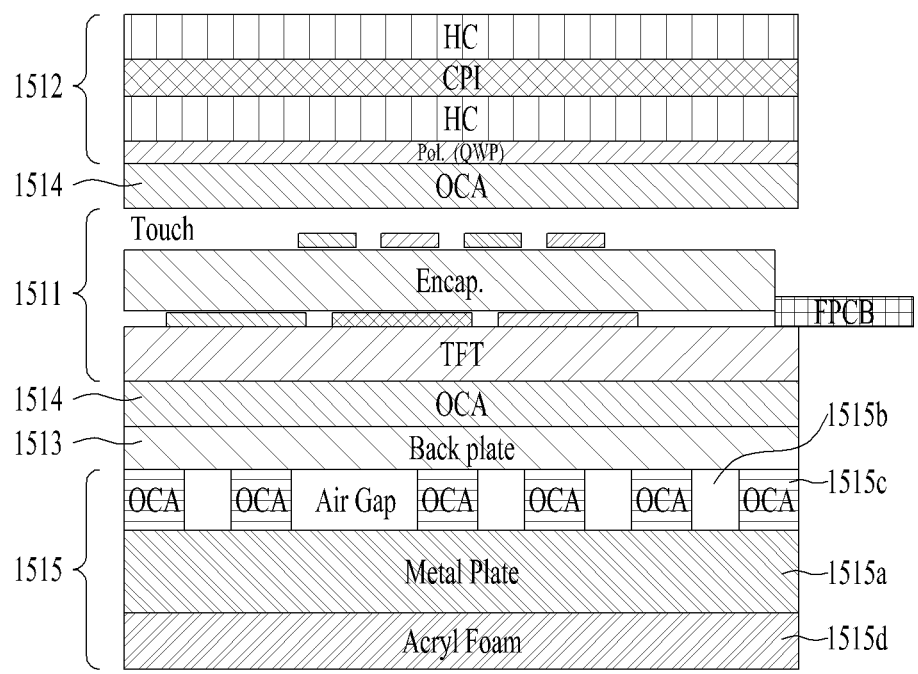

FIG. 7 is a view illustrating other embodiment of a flexible display unit 151 of the present disclosure. A support 1515 having both rigidity and flexibility is provided to attenuate impulse transferred in a thickness direction and a side direction as shown in FIG. 6(c).

The metal plate 1515a of a rigid material may be positioned on the rear surface of the display panel 1511. At this time, the metal plate 1515a may be disposed to be spaced apart from the display panel 1511 such that an air gap 1515b may be formed between the metal plate 1515a and the display panel 1511. A spacer 1515c may be provided at the end of the display unit as shown in FIG. 7(a) to form the air gap 1515b between the metal plate 1515a and the display panel 1511. At this time, if a rigid material is used as the spacer 1515c, since the display panel 1511 may be pushed, a soft material may be used as the spacer 1515c.

However, if the spacer 1515c is positioned only at the end of the display unit, its center portion may be sagged, whereby a problem occurs in that the spacer 1515c substantially adjoins the metal plate 1515a. Therefore, a plurality of spacers 1515c may be provided as shown in FIG. 7(b). Since the spacer 1515c is also disposed on an active area to which the screen of the display panel 1511 is output, a soft material may be used as the spacer 1515c to prevent the display panel 1511 from being pushed and damaged.

The transparent resin may be made of a material such as acryl or silicon, and may serve as the spacer 1515c if it is coated at a predetermined thickness with elasticity. If the air gap 1515b is formed instead of fully coating the transparent resin, it is more excellent to block impulse transfer. Therefore, the air gap 1515b may be formed as shown in FIG. 7(b).

Figure 8:
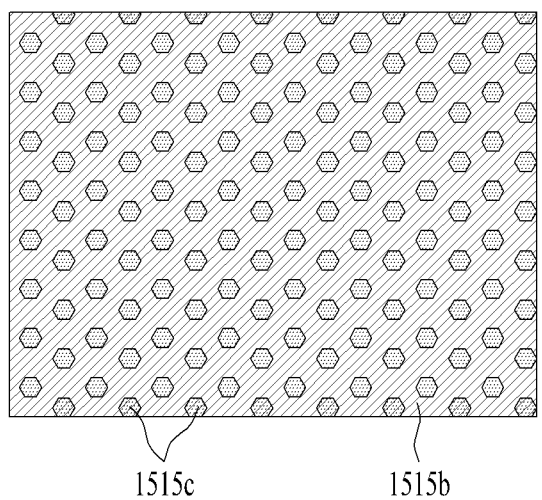
FIG. 8 is a view illustrating an embodiment of a spacer in FIG. 7(*b*).
Figure 8:
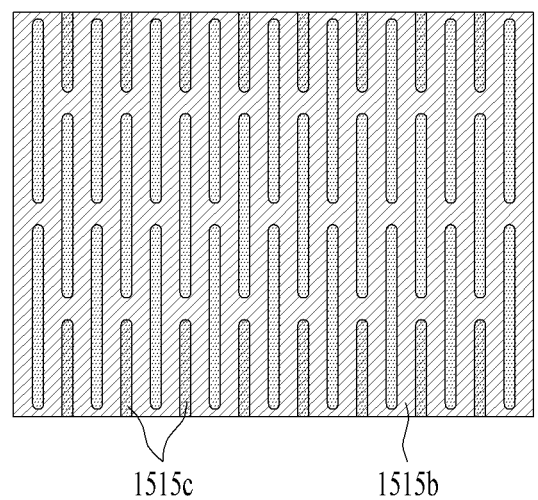

FIG. 8 is a view illustrating an embodiment of a spacer 1515c in FIG. 7(b). The spacers 1515c may be disposed to be spaced apart from one another at a predetermined interval in the form of dots as shown in FIG. 8(a) to absorb impulse and attenuate sagging. The spacers 1515c may be extended longitudinally in one direction as shown in FIG. 8(b).

This type may restrict bending deformation when the flexible display unit 151 is bent. Therefore, if the spacers extended up and down are used when bending occurs in left and right directions, it may minimize bending deformation of the flexible display unit.

An elastic film 1515d member such as acryl foam may additionally be deposited on the rear surface of the metal plate 1515a as shown in FIGS. 7(a) and 7(b) to improve an impulse offset effect.

As described above, since the mobile terminal of the present disclosure comprises the flexible display unit 151 strong to impulse, the flexible display unit 15 is not easily damaged even by external impulse although bent together with the hinge unit in accordance with deformation of the hinge unit.

Also, if the support 1515 having a layered structure of a rigid material and a soft material is disposed on the rear surface of the display panel 1511, the display panel 1511 is effectively prevented from being damaged by transfer of impulse applied to the flexible display unit 151.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A mobile terminal comprising:
a first body;
a second body disposed in parallel with the first body;
a hinge unit connecting the first body with the second body such that an angle between the first body and the second body varies;
a display panel positioned on one surface of the first body and one surface of the second body and having a bending area positioned at a portion corresponding to the hinge unit; and
a window positioned on a front surface of the display panel,
wherein the window includes:
first windows which are positioned on the first body and the second body and are not bent, and
a second window which is bendable and includes a first portion on the bending area of the display panel and a second portion fully covering a front surface of the first windows, and
wherein the first portion of the second window is thicker than the second portion of the second window.

2. The mobile terminal of claim 1, further comprising:
a transparent adhesive positioned between the first windows and the second window,
wherein the transparent adhesive has elasticity stretching when the first body and the second body are folded.

3. The mobile terminal of claim 1, wherein the second window includes a third portion covering a rear surface of the first windows.

4. The mobile terminal of claim 1, wherein the second window is coupled to the first windows by a double injection molding.

5. The mobile terminal of claim 1, further comprising:
a transparent adhesive adhering the second window with the first windows,
wherein the transparent adhesive includes a silicon material.

6. A mobile terminal comprising:
a first body;
a second body disposed in parallel with the first body, wherein the first body and second body are foldably connected to each other such that an angle between the first body and the second body varies;
a display panel positioned on one surface of the first body and one surface of the second body and having a bending area positioned at a portion corresponding to the connection of the second body with the first body; and
a window positioned on a front surface of the display panel,
wherein the window includes:
a first non-bendable window positioned on the first body;
a second non-bendable window positioned on the second body and being spaced apart from the first non-bendable window by the bending area; and
a bendable window including a first portion on the bending area of the display panel and a second portion fully covering a front surface of the first non-bendable window and the second non-bendable window, and
wherein the first portion of the bendable window is thicker than the second portion of the bendable window.

7. The mobile terminal of claim 6, further comprising:
a transparent elastic adhesive adhering the first portion of the bendable window to the display panel and the second portion of the bendable window to the first non-bendable window and the second non-bendable window.

8. The mobile terminal of claim 6, wherein a thickness of the first portion of the bendable window is thinner than a thickness of the first non-bendable window and the second non-bendable window.

9. The mobile terminal of claim 6, further comprising:
a metal plate positioned on a rear surface of the display panel; and
a plurality of spacers forming an air gap between the display panel and the metal plate.

10. The mobile terminal of claim 9, wherein the plurality of spacers are spaced apart from one another at a predetermined interval.

11. The mobile terminal of claim 9, wherein the plurality of spacers are extended in a second direction vertical to a first direction and spaced apart from one another in the first direction.

12. The mobile terminal of claim 9, wherein the plurality of spacers comprise a coated or hardened transparent adhesive or an adhered transparent tape.

13. The mobile terminal of claim 9, further comprising:
an impulse absorbing layer of a soft material positioned on a rear surface of the metal plate.

* * * * *